United States Patent
Baldischweiler

(10) Patent No.: US 8,912,997 B2
(45) Date of Patent: Dec. 16, 2014

(54) DISPLAYING USEFUL INFORMATION ON A DISPLAY ELEMENT

(75) Inventor: Michael Baldischweiler, München (DE)

(73) Assignee: Giesecke & Devrient GmbH, Munich (DE)

( * ) Notice: Subject to any disclaimer, the term of this patent is extended or adjusted under 35 U.S.C. 154(b) by 907 days.

(21) Appl. No.: 12/864,632

(22) PCT Filed: Jan. 27, 2009

(86) PCT No.: PCT/EP2009/000512
§ 371 (c)(1),
(2), (4) Date: Jul. 26, 2010

(87) PCT Pub. No.: WO2009/095203
PCT Pub. Date: Aug. 6, 2009

(65) Prior Publication Data
US 2010/0309105 A1  Dec. 9, 2010

(30) Foreign Application Priority Data
Jan. 29, 2008 (DE) .......................... 10 2008 006 532

(51) Int. Cl.
*G09G 3/36* (2006.01)
*G07F 19/00* (2006.01)
*H04L 29/06* (2006.01)
*G07G 1/01* (2006.01)
*G06F 21/84* (2013.01)
*G09F 9/30* (2006.01)
*G06F 3/14* (2006.01)

(52) U.S. Cl.
CPC ............... *H04L 63/08* (2013.01); *G07F 19/20* (2013.01); *G07F 19/205* (2013.01); *G07G 1/01* (2013.01); *G06F 21/84* (2013.01); *G09F 9/30* (2013.01); *G06F 3/14* (2013.01)
USPC .......................................................... 345/102

(58) Field of Classification Search
USPC .......................................................... 345/102
See application file for complete search history.

(56) References Cited

U.S. PATENT DOCUMENTS

| | | | |
|---|---|---|---|
| 2003/0025667 A1* | 2/2003 | Yerazunis et al. | 345/102 |
| 2004/0069853 A1 | 4/2004 | Aharonson | |
| 2007/0063055 A1* | 3/2007 | Graf et al. | 235/492 |
| 2008/0179403 A1 | 7/2008 | Endlebardt et al. | |
| 2009/0109682 A1* | 4/2009 | Gardner et al. | 362/296.01 |

FOREIGN PATENT DOCUMENTS

| | | |
|---|---|---|
| DE | 10317257 A1 | 11/2004 |
| WO | 2008/094890 A2 | 8/2008 |

OTHER PUBLICATIONS

International Search Report in PCT/EP2009/000512, Apr. 1, 2009.

* cited by examiner

*Primary Examiner* — Kevin M Nguyen
*Assistant Examiner* — Cory Almeida
(74) *Attorney, Agent, or Firm* — Workman Nydegger

(57) ABSTRACT

For displaying useful information (25) on a display element (21) of a terminal device (20), display data comprising useful information (25) are displayed (S2) on the display element (21), and light signals (18) are emitted (S3) to the display element (21) by a light signal unit (12) of a portable data carrier (10), wherein the display data are so displayed (S2) on the display element (21), and the light signals (18) so emitted (S3) to the terminal device (20), that a viewer of the display element (21) can recognize (S5) the useful information (25).

52 Claims, 4 Drawing Sheets

DISPLAYING USEFUL INFORMATION ON A DISPLAY ELEMENT

Figure 1:
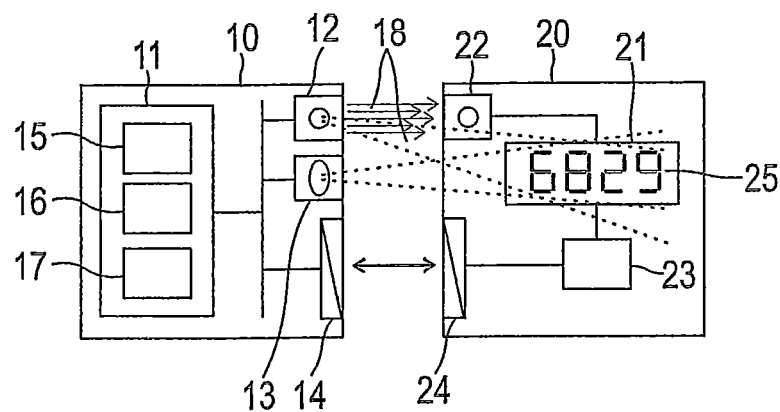

The present invention relates to a method for displaying useful information on a display element of a terminal device, to a portable data carrier enabling a recognition of the useful information by a viewer of the display element, and to such a terminal device.

For many different electronic applications it is essential that a viewer of a computer screen or laptop screen or of an LCD display element of a telecommunication terminal or the like can be sure that the information displayed to him has not been tampered with and comes from a trustworthy point. This applies for example to identifiers and passwords, e.g. one-time passwords, which give the viewer of the relevant display element access to a secure area, e.g. an account or the like, or to transaction amounts or the like which are displayed on a display element of a transaction device, e.g. an automatic teller machine.

However, the display of such useful information on a display element of a terminal device usually involves the problem that the display element is activated and controlled by a driver or an operating system of the terminal device, and the data traffic of such system software is not separately secured. Therefore, there is fundamentally the possibility of a so-called man-in-the-middle attack, by which an attacker inserts himself between the display element and the system software and is thereby able to read out useful information to be displayed and/or replace it by tampered-with information.

DE 103 17 257 A1 discloses a contactless data carrier having a light-emitting diode wherein a precondition for contactless data communication with a reading device is a deliberate use of the contactless data carrier by the owner. This is ascertained by the reception of an optical signal from the data carrier by the reading device, which indicates that the data carrier is at least not covered within a pocket or the like. However, the trustworthiness of information displayed on a display element of the reading device cannot be thereby ensured or judged.

It is therefore the object of the present invention to ensure a secure display of trustworthy useful information on a display element and to guarantee the authenticity of the useful information.

This object is achieved by a method, a portable data carrier and a terminal device having the features of the independent claims. Advantageous embodiments and developments are stated in the dependent claims.

In a method according to the invention, there are displayed on a display element of a terminal device display data which comprise the useful information (payload information). Through a portable data carrier, light signals are emitted to the display element, the display data being so displayed on the display element, and the light signals so emitted to the display element, that a viewer of the display element can recognize the useful information. In this connection the display data are so configured that their useful information is not recognizable to a viewer of the display element without the emission of light signals to the display element.

A corresponding portable data carrier comprises an interface for connection to the terminal device as well as a light signal unit which so emits the light signals intended for the display element of the terminal device as to cause a displaying of the display data on the display element, so that a viewer can recognize the useful information. The term "light signal" is understood in this connection to include the total electromagnetic wave spectrum or any portion thereof.

The invention enables a double protection of the useful information. On the one hand, an unauthorized, electronic interception of the useful information, e.g. on the basis of a man-in-the-middle attack, is not possible because in this way only the display information can be intercepted, but not the light signals necessary for making the useful information embedded in the display data recognizable, because the useful information is only decodable through the intended sending of the light signals. On the other hand, the authenticity of the useful information and of the corresponding useful-information source can be ensured, because the useful information can only be made recognizable with light signals that have been predefined or authorized by the useful-information source. No complex, e.g. cryptographic, security infrastructure going beyond that is necessary.

Besides the useful information, the display data comprise spurious information which, upon displaying of the display data, causes the useful information not to be recognizable, or at least not distinguishable from the spurious information, to a viewer without emission of the light signals. Therefore, the displaying of the display data and the emission of the light signals must be in coordination with each other such that the spurious information is masked out of the displayed display data through the light signals emitted by the light signal unit.

Because the light signals must thus be in coordination with the exact way the useful information is embedded in the display data, the useful-information source must also predefine the light signals. Therefore, as soon as useful information has been made recognizable on the display element by light signals, one can be sure that the useful information comes from the useful-information source and not from an attacker.

There are at least two possibilities for emitting the light signals to the display element: On the one hand, the light signals can be fed into the terminal device to influence a driving of the display element there; on the other hand, the display element can be illuminated directly with the light signals.

In the first-mentioned case, the display element can be e.g. an LCD segment display which represents black characters on a white background, whereby the spurious information is masked out by the light signals fed by the light signal unit into an optical interface of the terminal device causing a black representation of the display background of the LCD display element, so that the spurious information is masked out while the useful information remains recognizable. With an LCD segment display displaying characters in grayscale values or in color, the spurious information can be masked out by a corresponding grayscale/colored background representation.

In the last-mentioned case, the targeted direct illumination of the display element with light signals causes displayed spurious information to be masked out. If the display element is e.g. a color display element and the light signal unit is a colored illumination source, the color display element is illuminated with color light signals which are coordinated with the display colors of the spurious information or of the useful information such that either the spurious information is no longer recognizable, or the useful information is emphasized and thereby recognizable. This can be obtained by an additive or subtractive color mixture of the display color and the light signal color by spurious information, which is recognizable against its background in an unilluminated state, assuming the same color as the particular background through a color mixture with corresponding color light signals. With the useful information, the colored illumination source can be completely switched off or illuminate the display element in a color having no such masking-out color mixing effect.

The display element can also be covered with an optically activatable foil, while the light signal unit is an infrared illumination source which puts the foil in an activated state. Upon illumination with infrared light signals the otherwise optically transmissive foil then becomes opaque, so that spurious information can be masked out. Conversely, it is also possible that an otherwise optically opaque foil becomes optically transmissive to useful information through a suitable illumination. In any case the foil is illuminated with infrared light signals such that either the spurious information is actively masked out, or the useful information is actively made recognizable.

The light signal unit preferably comprises at least one light-emitting diode or the like to feed the light signals either via an optical interface into the terminal device, or to illuminate the display element directly. The light signal unit can also comprise several light-emitting diodes which emit light of different wavelengths to generate colored light signals for color mixing effects.

To achieve the effect according to the invention, the useful information is embedded in the display data in a certain manner, so that the useful information is modulated upon displaying of the display data such that a viewer of the display element cannot recognize the useful information without emission of light signals, because either the useful information is not distinguishable from the spurious information, or no reproducible information at all is recognizable. The light signals are thus emitted such that the useful information is demodulated and becomes recognizable.

Preferably, the display data consist of a multiplicity of temporally successively (i.e. sequentially) displayed pieces of spurious information and useful information. In coordination therewith, the light signals are emitted to the display element by the light signal unit in the form of sequential light pulses, so that the time-modulated useful information is time-demodulated and thus becomes recognizable. The light pulses are then emitted at the same time intervals or the same frequency at which the useful information or the spurious information is displayed upon displaying of the display data, depending on whether the useful information is to be emphasized or the spurious information suppressed. In this connection the useful information can be time-modulated upon displaying of the display data such that the demodulated useful information is recognizable on the display element as a constant, static display, e.g. as a multi-point character string, or as a time-variable display, e.g. as a ticker-tape display or temporally recurring character string.

The useful information can additionally or alternatively be color-modulated by displaying of the display data on a color display element, e.g. by the useful information being displayed in a color differing from the color of the spurious information and/or of the display background only upon illumination with light signals of a predefined wavelength. The color modulation/demodulation can be obtained e.g. by color light signals being emitted which, when mixed with the color of the displayed useful information, lead to the useful information being set apart in color from its background and/or from the spurious information, or to the spurious information being masked out of the display data and only the useful information remaining recognizable to the viewer.

The useful information can be represented by the displaying of the display data in a random, i.e. unreproducible, manner. However, the emission of the corresponding light signals by the light signal unit must then be effected in the same manner predefined by the random-controlled modulation.

Further, the useful information can be embedded in the display data such that a corresponding emission of light signals leads to the recognizable useful information having predefined temporal color change or grayscale change. Thus, useful information consisting of a certain character string or numeric string can also be illuminated with light signals such that it is displayed consecutively inverted in a characteristic manner or time-variably in another manner, so that there arises for the viewer an optical effect, e.g. a flashing or tilting effect, which can serve as an additional indication of authenticity of the useful information. Such an optical effect additionally impedes an attack, because even when the useful information can be intercepted, the optical effect is unreproducible for the attacker.

Also, the useful information can be embedded in the display data such that the useful information recognizable on the display element has predefined movements, e.g. translations or rotations. The useful information is then recognizable e.g. as a statically displayed character string which carries out a random or predefined movement on the display element. Such an optically variable display of the useful information impedes a direct scanning of the display element with the aim of intercepting the useful information by optical means, e.g. by optical character recognition (OCR).

Likewise, it is possible to embed several pieces of useful information in the display data separately from each other, e.g. two character strings suitable for different purposes. Upon emission of light signals, the several separate pieces of useful information are recognizable to the viewer on the display element at the same time. Upon the use of a color display element, the several separate pieces of useful information can be recognizable on the color display element e.g. in pairwise different colors.

In an especially preferred embodiment of the invention, the portable data carrier is also the useful-information source which provides the display data to the terminal device for display on the display element. The data carrier is then equipped with a communication unit which transfers via a data communication interface the display data intended for display by the display element. The useful information embedded in the display data is in this connection for example an identifier, a password or another secret character string, preferably a one-time password which the data carrier generates as a one-time password generator for use by the viewer of the display element.

It is not possible to tamper with or electronically read out such a one-time password, because the one-time password only becomes recognizable as a result of a coordinated sending of the light signals, and at best the display data can be intercepted in a man-in-the-middle attack, but not the emitted light signals. Tampering with the display element or an attack on the display data can furthermore be recognized by information appearing on the display element that is recognizable (or not recognizable) independently of an emission of the light signals or of an illumination of the display element with the light signals. Thus, the light signal unit can be interrupted temporarily, so that in the case of tampered-with display data, i.e. of information predefined by the attacker, this is also recognizable without emission of light signals. The data carrier can comprise an appropriate interruption unit with which an observer of the display element can interrupt the light signal unit temporarily in order to carry out this test.

The portable data carrier preferably comprises a synchronization unit which activates the light signal unit and the communication unit in coordination with each other such that the emission of the light signals by the light signal unit and the transfer of the display data by the communication unit are synchronized with each other. Such synchronization ensures that a viewer of the display element can recognize the useful information. In this connection the synchronization unit of the data carrier can activate the light signal unit according to predefined synchronization data relating to a synchronization of the displaying of the display data and of the emission of the light signals. On the basis of the synchronization data predefined externally or by the data carrier, the light signal unit emits light signals to the terminal device which are synchronized with the displaying of the display data on the display element, and lead to recognizability of the useful information.

The synchronization data can be determined for example in the course of a negotiation of session parameters between the data carrier and the terminal device prior to a data communication. According to such synchronization data determined in cooperation, a display element control means of the terminal device then displays the display data on the display element, and the light signal unit of the data carrier is activated by a synchronization unit to emit light signals in synchronism therewith.

Likewise, synchronization data can be predefined by the terminal device or a third instance. Preferably, such synchronization data are transferred to the data carrier by optical means, e.g. by representation of the synchronization data on the display element, so that a read-out unit of the data carrier, e.g. a brightness sensor, can read out the synchronization data from the display element and relay them to the synchronization unit. In this connection the synchronization data can again be represented on the display element such that they can be read out only upon a coordinated illumination by the light signal unit. This ensures that an unauthorized interception of the synchronization data as part of a man-in-the-middle attack is impossible.

Alternatively, there can also be installed on the terminal device a synchronization application permitting the viewer of the display element to predefine synchronization data individually, e.g. by adjusting a bar graph display or the like on the display element in such a way that it has a certain position or a certain time behavior. According to the synchronization data manually adjusted in this manner, the synchronization unit of the data carrier can again activate the light signal unit. In particular, the data carrier can comprise in this connection a sensor which scans the display element and relays corresponding scan information to the synchronization unit, so that the synchronization unit readjusts the activation of the light signal unit on the basis of the scan data such that e.g. a constant display of the useful information becomes recognizable on the display element.

In principle, any desired data carrier can be employed that is equipped with a processor for execution e.g. of a synchronization unit and a light signal unit, e.g. in the form of light-emitting diodes. However, a data carrier according to the invention is preferably a (U)SIM mobile communication card, a USB memory element, a chip card or smart card, a USB lamp equipped with a security element, or the like. As a terminal device there can thus preferably be used mobile telecommunication terminals, transaction terminals, e.g. automatic teller machines, computers or laptops with monitors or TFT screens, or the like.

Figure 2:
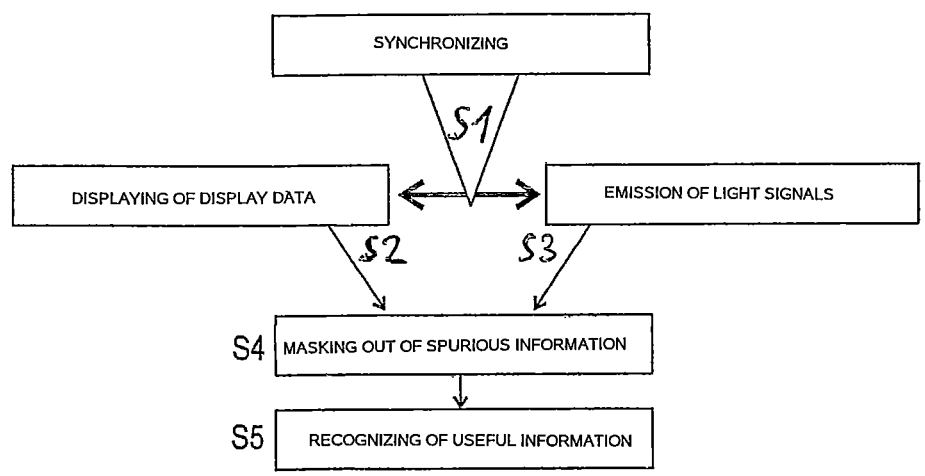
Figure 3:
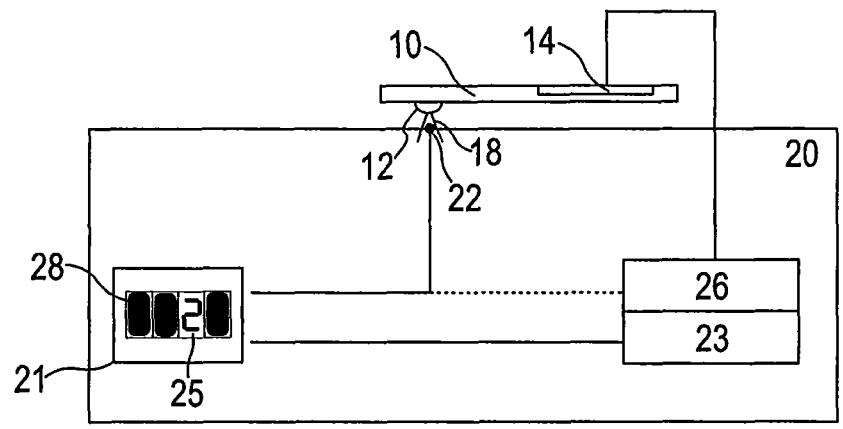
Figure 4:
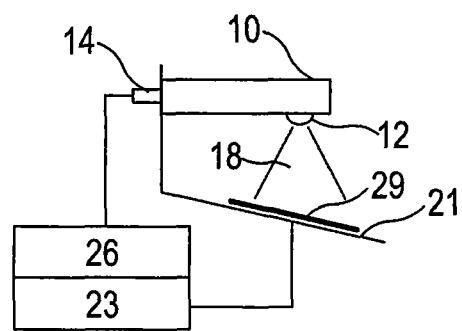
Figure 5:
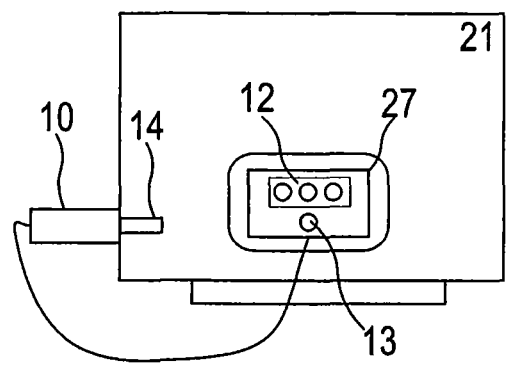
Figure 6:
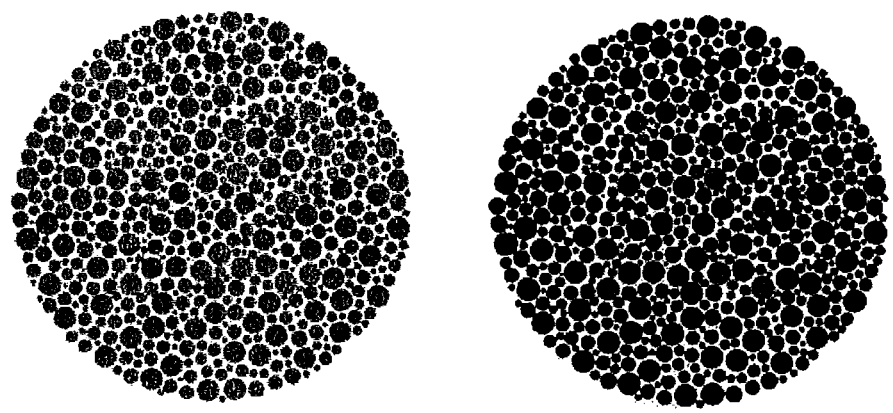

Further features and advantages of the invention will result from the following description of different exemplary embodiments and alternative embodiments according to the invention in connection with the accompanying drawings. Therein are shown:

FIG. 1 a structure of a portable data carrier and of a terminal device;

FIG. 2 a flowchart of the method according to the invention;

FIG. 3 a first embodiment of the invention with a chip card and an LCD display element;

FIG. 4 a second embodiment of the invention with a USB memory element and an LCD display element of a terminal;

FIG. 5 a third embodiment of the invention with a USB illumination source and a TFT display element;

FIG. 6 an example of displayed useful information; and

Figure 7:
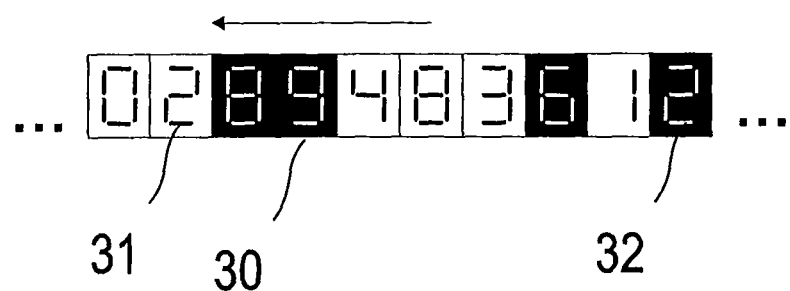

FIG. 7 an example of a numeric string with useful information displayed alternatingly normally and inversely.

The portable data carrier 10 depicted in FIG. 1 comprises a processor 11 on which a control application, a synchronization application and a communication application can be executed as control unit 15, synchronization unit 16 and communication unit 17. Further, the data carrier 10 comprises a light signal unit 12 which emits light signals 18 to the terminal device 20. Depending on the particular embodiment, the data carrier 10 can additionally comprise a read-out unit 13 for reading out data from a display element 21 as well as a data communication interface 14 for data communication with a terminal device 20.

A complementary terminal 20 comprises a display element 21 which can be any desired display, e.g. LCD display with a segment display or a higher (point) resolution, any desired computer screen, a TFT display or the like. The display of display data on the display element 21 is controlled by a display element control means 23, e.g. a driver of the display element 21 or a part of an operating system of the terminal 20. The display element 21 can be in particular a color display element which permits a polychrome color representation according to any desired color space, e.g. according to an RGB, HSV, CMYK or Lab color space.

The terminal 20 can comprise a sensor as an optical interface 22 via which light signals 18 emitted by the light signal unit 12 are fed into the terminal, from where they are relayed via an optical communication link to the display control means 23 or directly to the display element 21. Display data to be displayed on the display element 21 can be received by the terminal 20 via a suitable interface from a third point, e.g. from a background server or a website on the Internet. In the event that the data carrier 10 predefines display data, the terminal 20 comprises a data communication interface 24 for data communication with the data communication interface 14 of the data carrier 10.

The display data to be displayed on the display element 21 comprise useful information 25 embedded therein (in FIG. 1 the numeric string "6829"), which is not recognizable when the display data are displayed on the display element 21 without light signals 18 from the light signal unit 12 at the same time falling directly upon the display element 21 or being fed into the terminal 20 and evaluated there by the display control means 23 for displaying of the display data. The useful information 25 is thus made unrecognizable or encoded in the display data by spurious information and can only be made recognizable or decoded with the help of the light signals 18.

For this purpose it is necessary that the emission of the light signals 18 by the light signal unit 12 of the data carrier 10 and the displaying of the display data on the display element 21 by the display control means of the terminal 20 are in precise coordination with each other or synchronized with each other. In this connection the emission of the light signals 18 by the light signal unit 12 can comprise a direct illumination of the display element 21, so that the spurious information is masked out as a result of a desired optical effect. Likewise, the light signals 18 can also be fed via the optical interface 22 into the terminal 20 and be evaluated there by the display element control means 23. In any case the synchronization requirement leads to an effective protection of the useful information 25, because the latter cannot be tampered with or intercepted, on the one hand, and the authenticity of the information source, e.g. of the background server or the data carrier itself, is guaranteed, on the other hand.

Accordingly, the method for displaying the useful information 25 on the display element 21 as illustrated in FIG. 2 comprises at least five essential steps: In step S1 a synchronization is produced between the emission of the light signals 18 and the displaying of the display data by e.g. synchronization data being generated and taken into consideration. In the steps S2 and S3 executed in parallel, the display data are displayed on the display element 21 according to the synchronization data (step S2) and at the same time light signals 18 are emitted by the light signal unit 12 to the display element 21 according to the synchronization data (step S3).

Upon displaying of the display data (step S2) the useful information 25 is modulated such that it is not recognizable to a viewer of the display element 21 without emission of the light signals 18, because it is either indistinguishable from the spurious information or is not perceived as separate information at all. For this purpose the useful information can be for example time-modulated on an LCD display element or color-modulated on a color display element. Accordingly, the emission of the light signals 18 (step S3) causes the useful information 25 embedded in the display data to be demodulated, for example by sequential light pulses in order to mask out the spurious information in such a way that the useful information 25 becomes recognizable, or by color light signals which make useful information 25 that is otherwise indistinguishable from the spurious information and/or the background appear in a color which sets it apart from the spurious information and/or from the background. Because these two steps are in coordination with each other such that spurious information of the display data is masked out upon displaying of the display data (step S4), the useful information 25 embedded in the display data becomes recognizable to a viewer of the display element 21 (step S5).

In particular for the steps S1 to S3 several different implementation variants are conceivable, which will be described hereinafter in connection with the embodiments shown in FIGS. 3 to 5:

FIG. 3 shows a chip card 10 with an interface 14 according to ISO 7816, and a light-emitting diode drivable by a chip-card controller, as a light signal unit 12. The chip card 10 is connected via the interface 14 to a controller of a mobile station 20 which comprises an operating system 26. A display driver 23 which can also be part of the operating system 26 controls the LCD display element 21 of the mobile station 20. In the receiving holder of the mobile station 20 there is integrated a light sensor or another optical interface 22 with a light guide which can receive light signals 18 from the light-emitting diode 12 when the chip card 10 is seated in the receiving holder.

The chip card 10 is configured e.g. as a one-time password generator, and display data in which a one-time password is embedded as useful information 25 are transferred via the ISO interface 14 to the operating system 26 and the driver 23 of the mobile station 20 and finally displayed on the display element 21. At the same time, light signals 18 synchronized with the displaying of the display data are fed via the optical interface 22 into the mobile station 20.

Basically, the light signals 18 activate or deactivate a display background 28 of the display element 21 to make the useful information 25 recognizable to the viewer. In FIG. 3 there is shown an LCD display element as the display element 21 which reaches information through a black representation—for example the digit "2" shown in the Figure—against a contrast-forming, for example white, display background 28.

The display background 28 can be deactivated, i.e. appear black, in its ground state. Information represented in black is thus not recognizable. As long as the chip card 10 sends no light signals, the display background 28 is deactivated. Spurious information in the displayed information can thus be masked out in targeted fashion. As soon as (and as long as) useful information 25 is displayed, the chip card 10 sends a light signal 18. The display background 28 is thus activated and the displayed useful information 25 becomes recognizable to the viewer. Even when the LCD display element 21 represents the information inverted, i.e. for example as a white digit in a black field, the light signals 18 can be employed for activation/deactivation unchanged to achieve the same effect. Advantages of a possible, alternately normal and inverted representation of the useful information will be described more closely below with regard to FIG. 7.

Preferably, only the display background 28 of a part of the display element 21 is influenced by the light signals 18. Said part can comprise several segments which are intended for displaying for example one digit in each case. Areas of the display element 21 located outside said part of the display element 21 (and not depicted) can thus be employed for normal purposes unchanged.

In FIG. 3 there is shown a variant in which the display background is activated when at the same time a control signal of the display driver 23 (depicted by dashed line) and no light signals 18 are present. Through the targeted activation of the light-emitting diode 12 or the targeted emission of light signals 18 by the light-emitting diode 12, the light signals 18 received by the optical interface 22 can lead, through a corresponding control (depicted by dashed line) through the operating system 26 and the display control means 23 or a direct driving of the display element 21, to a display background 28 of the LCD display element 21 being activated/deactivated. The activation/deactivation can also be effected in such a way that a defined switch on/off of the relevant segment area of the display element 21 is possible. For example, a light signal 18 can lead to a display background 28 being represented in black, so that spurious information displayed in black is masked out. In the case of useful information 25 there is accordingly no light signal 18 fed in, so that said information is recognizable to a viewer of the display element 21. Accordingly, in the LCD display element 21 shown in FIG. 3, the background is activated in three display points to mask out corresponding spurious information, and useful information 25 is recognizable only in one display point. For logically combining the light signals with the control signal accordingly, there is employed a logic element (not depicted) which can provide an activation signal individually for each segment area.

In principle, the display data can comprise any desired useful information 25, e.g. in the form of numeric or character strings. However, preferably a one-time password 25 is embedded in the display data according to a time modulation, so that the one-time password 25, or individual characters of the same, is displayed at predefined time intervals on the display element 21. Within said time intervals spurious information is displayed, so that a viewer of the display element 21 cannot recognize the one-time password 25 without the spurious information being masked out by light signals 18 coordinated with said time intervals, because otherwise either an unreproducible activity of the display element 21 ("jumbled numbers") or a uniformly gray or black surface is displayed, depending on the display frequency of the display data.

Through the synchronization of the display of the display data with the emission of the light signals 18, the useful information 25 is protected against tampering and interception, because an attacker can recognize and tamper with the display data at best, but not at the same time also the activity of the light signal unit 12. If an attacker nevertheless loads false information on the display element 21, this is easy to recognize through a temporary interruption of the light signal unit 12, because the false information either would also be recognizable without emission of light signals 18 or could not even be so designed that it is only recognizable upon emission of light signals 18.

The display driver 23 is so configured that it can output the display data preferably with a fraction of the CLK signal (clock signal on the contact C3 of the ISO interface). In this manner there can be ensured a synchronization between the activity of the light-emitting diode 12 and the displaying of the display data on the LCD display element 21. An attack on the integrity of the useful information 25, e.g. by means of a man-in-the-middle attack, can be additionally impeded by the useful information 25, which is normally a numeric or character string, being inverted at a certain frequency or with a certain time behavior, so that a flashing or tilting effect arises for the viewer. If said flashing or tilting effect is created solely by the light signals 18 and is not part of control information of the display data, it can be used as an additional security feature which an attacker cannot recognize solely by intercepting the display data.

FIG. 4 shows a USB memory element 10 with a light-emitting diode 12 which can be connected via a USB interface 14 to a transaction device 20, e.g. an automatic teller machine. The display data are transferred from the USB memory element 10 via the USB interface 14 to the operating system 26 of the transaction device 20 and relayed to the display driver 23. The display data can have embedded therein e.g. a one-time password again as an individual identification number of the user vis-à-vis the terminal 20. Likewise, it is possible that the display data are provided not by the USB element 10 but by the terminal 20 or a third point connected to the terminal. This is the case for example with a transaction amount or an account balance which is to be displayed to the user of the USB element 10 in the course of a transaction.

Independently of the actual useful-information source, it is guaranteed here, too, through a synchronization between the light signals 18 cast by the light-emitting diode 12 directly on the display element 21 of the terminal 20 and the displaying of the display data on a display element 21 that the useful information 25 is recognizable to a viewer of the display element 21 when he uses the USB memory element 10 accordingly. The display data are transmitted via the USB interface 14 to the operating system 26 of the terminal 20 and transferred to the display driver 23 for displaying on the display element 21.

To guarantee the necessary synchronization there can be displayed at a predefined position of the display element 21 synchronization data which are read out by a reader unit 13, e.g. a brightness sensor, and relayed to a synchronization unit 16 of the USB memory element 10. Alternatively, the synchronization data can also be defined matchingly in the course of a negotiation of session parameters between the control unit 15 of the USB memory element 10 with the terminal 20. Also, the synchronization data can be transferred via the USB interface 14 from the terminal 20 to the USB memory element 10. In any case the synchronization unit 16 then activates the light-emitting diode 12 in a manner synchronized with the displaying of the display data to emit light signals 18 onto the display element. For this purpose, at the onset of the displaying of the display data, a start signal is also sent via the display element 21 to the USB memory element 10, whereupon at the same time the emission of the light signals 18 begins.

Preferably, the USB memory element 10 comprises as a light signal unit 12 an infrared illumination source or several light-emitting diodes of different wavelengths to generate colored light signals 18. In the case of an infrared light signal unit 12, there can be generated an infrared illumination 18 which directly illuminates the display element 21 and an active foil 29 attached thereto. Upon impingement of infrared light signals 18 on the foil 29 the latter is excited at the corresponding points and passes into an optically blocking/transmissive state there. In this manner the foil 29 can change its optical properties through the infrared illumination 18 such that, in the case of an initially optically transmissive foil, areas displaying spurious information are blocked or, in the case of an initially optically blocking foil, areas displaying useful information 25 are made optically transmissive.

In the case of a color light signal unit 12 which projects colored light signals 18 onto a color display element 21 of the terminal 20, a targeted masking out of the spurious information and making recognizable of the useful information 25 can be brought about by additive or subtractive color mixing effects between the color of the color light signals 18 and the display data, in particular of the useful information 25. Thus, color mixing effects between the color light signals 18 and the color display can cause useful information 25 which is otherwise indistinguishable with regard to its color from the spurious information or from the display background to become recognizable through illumination with suitable color light signals 18. Likewise, an illumination with color light signals 18 can cause spurious information which is otherwise indistinguishable from the displayed useful information to be masked out through a color mixture. This color modulation/demodulation of the useful information 25 can also be combined with the time modulation/demodulation explained in connection with FIG. 3.

In this manner it can be ensured that the displayed display data come from the USB memory element 10 and are thus trustworthy and were not e.g. loaded onto the display element 21 via an attack. Upon the use of a color display element 21 and color light signals 18, there can of course also be displayed, besides numeric and character strings, logos and other representations in special color combinations which can only be correctly recognized by a viewer when the matching color illumination is effected in synchronized fashion through the light signal unit 12 or the synchronization unit 16. An attack by means of a false color representation of display data is impossible in this connection, because it is impossible for an attacker to infer when and at what wavelength the USB memory unit 10 performs a masking out of spurious information from the display data displayed in color. FIG. 6 shows an example of useful information 25 (the number "12") which is unrecognizable upon the displaying of the display data (on the left) and only becomes distinguishable from its background, and thereby recognizable, upon illumination with suitable light signals 18.

Besides the above-explained possibilities for hiding the relevant useful information 25 in the display data through a (quick) sequential succession of spurious information and useful information 25 and/or through color mixing effects, there is additionally the possibility of configuring the useful information 25, e.g. characters, logos or the like, as temporally or locally varying (colored) useful information 25 which, upon illumination by corresponding (color) light signals 18, is not only recognizable on the display element 21, but also moves so as to vary in color and position according to a predefined movement pattern. In particular, it is possible to create tilting or flashing effects—e.g. an alternation between a normal display and an inverse display at a predefined frequency—which are preferably due solely to the use of color light signals 18, and which cannot be intercepted by an attack. In addition or alternatively, several pieces of useful information 25 can be displayed at the same time, for example as mutually overlapping, separate useful information 25 represented in different colors. For example, a one-time password can be displayed positively in red and a further identifier can be displayed at the same time negatively in green.

FIG. 5 shows a data carrier 10 configured as a USB lamp, with an integrated security element on which a control unit 15, a synchronization unit 16 and a communication unit 17 is installed. The USB lamp 10 can be connected to a computer or laptop or the like via the USB interface 14, and a lamp element 27 of the USB lamp 20, said element being attached flexibly to the USB memory element 10, can be placed on a certain point of the TFT display element 21 of the computer 20 to read it out and illuminate it. For this purpose the lamp element 27 comprises a light signal unit 12, which can comprise several colored light-emitting diodes, and a read-out unit 13, e.g. a brightness sensor or the like.

The trustworthiness of a website or Internet software, e.g. of a bank or comparable institute, displayed on the TFT display element 21 of the computer 20 can be ensured by display information being displayed on the website which display information comprises useful information, e.g. a one-time password as an access to the account data of a user, which is recognizable to a viewer only upon synchronized illumination with the USB lamp 10, which is possibly provided precisely for this purpose by the relevant institute. A user of the USB lamp 10 who can recognize correct useful information 25 can be sure that he has selected a trustworthy website or banking software and not a forged (phishing) website.

The synchronization of the emission of the light signals 18 and of the displaying of the display data is ensured via synchronization data which are displayed on the website and which the synchronization unit 16 of the USB lamp 10 can read from the website by means of the read-out unit 13. As additional security, said synchronization data can be represented on the TFT screen 21 such that they must be made visible by means of a predefined, e.g. colored, illumination through the light signal unit 21 before a readout.

A further possibility of defining the synchronization data is a manual determination by the user via a synchronization application executable on the computer 20. The user can use the synchronization application to adjust a display e.g. such that a running bar stops in a certain display area or that a display coming into consideration as useful information 25 becomes recognizable. Any change in the user's adjustment via the synchronization application can then be registered via the read-out unit 13 and transmitted as scan data to the synchronization unit 16 of the USB lamp 10, which changes the synchronization data and consequently the emission of the light signals 18 by the light signal unit 12 according to the scan data. This feedback causes the synchronization data to be so adjusted iteratively by the user that he can finally recognize the useful information 25, provided untampered-with, trustworthy display data are present.

FIG. 7 shows a numeric string 30 with several digits which are represented normally (black on white) or inverted (white on black). The numeric string can be displayed successively in the direction of the arrow on an individual segment of a display element, or be displayed running through in the direction of the arrow (from the right to the left)—at least partly at the same time—on several segments of a display element. At first, the digits of the numeric string 30 can be represented alternately normally and inverted, distributed randomly or according to a predetermined pattern, to generate for example a uniform gray tone in the numeric string for the viewer. The displayed useful information, here in the form of the digits 31 and 32 for the number "2", can be represented alternately normally and inverted, preferably according to a predetermined pattern. Through one of the above-described variants, the useful information is made discernible to the viewer with the help of the light (the light signals) of the portable data carrier. The viewer then sees the useful information as information tilting in its representation (tilting effect). The tilting effect can be employed as further protection, because it is harder to copy for an attacker.

In particular, the predetermined pattern for the representation of the useful information can have been selected by the viewer in advance, so that the viewer only accepts the displayed useful information when it is actually displayed according to his pattern. Adjustable criteria of the predetermined pattern are for example with/without tilting effect optionally as well as alternating rhythm (such as for example three times normal+one time inverse+three times normal . . . ), normal/inverse representation as the basic form of representation and/or representation that is static/runs through the display element optionally as well as running direction. The predetermined pattern or the corresponding user adjustments for the criteria, for a corresponding control of the generation of the light signals, is stored on the portable data carrier.

The invention claimed is:

1. A method for displaying useful information, the method comprising the steps:

displaying display data on a display element of a terminal device, the display data comprising the useful information; and emitting light signals by a portable data carrier to the display element, the portable data carrier including a light emitting unit, the light emitting unit emitting the light signals, wherein the lights signals include electromagnetic waves within the electromagnetic wave spectrum, and wherein the useful information, which is not recognizable in the display data for a viewer of the display element when the display data are displayed on the display element without the light signals emitted by the portable data carrier to the display element, becomes recognizable in the displayed data for the viewer of the display element when the light signals are emitted by the portable data carrier to the display element.

2. The method according to claim 1, comprising displaying on the display element display data which comprise spurious information besides the useful information, and coordinating the displaying of the display data and the emission of the light signals with each other such that the light signals cause a masking out of the spurious information from the displayed display data.

3. The method according to claim 2, wherein the display element is an LCD display element, and including masking out the spurious information by the light signals, thereby causing a display background of the LCD display element to be represented such that the spurious information is not recognizable to a viewer against the display background of the LCD display element.

4. The method according to claim 3, comprising causing the light signals to cause the display background of the LCD display element to be represented in the same color or in the same grayscale value as the spurious information to be masked out.

5. The method according to claim 2, wherein the display element is a color display element, and including masking out the spurious information by illuminating the color display element with color light signals which are coordinated with a color in which the spurious information is displayed on the color display element such that the spurious information is not recognizable to the viewer.

6. The method according to claim 2, comprising masking out the spurious information by a foil covering the display element that is illuminated with infrared light signals such that the foil is optically opaque to the spurious information.

7. The method according to claim 1, comprising modulating the useful information by the displaying of the display data, and emitting the light signals to the display element such that the useful information is demodulated and thereby becomes recognizable to the viewer.

8. The method according to claim 7, including time-modulating the useful information through sequential displaying of the display data, and emitting the light signals to the display element in the form of sequential light pulses, wherein the display data are displayed sequentially at such a high frequency that the useful information is not recognizable in the displayed display data without sending of the sequential light pulses.

9. The method according to claim 8, including time-modulating the useful information upon the displaying of the display data such that the useful information demodulated through the light pulses is recognizable on the display element statically or time-varyingly.

10. The method according to claim 8, including color-modulating the useful information by displaying the display data in color, and emitting the light signals to the display element in the form of color light signals, wherein the display data are displayed in color such that the useful information is not recognizable in the colored display data without emission of the color light signals.

11. The method according to claim 7, including modulating the useful information in a random manner through the displaying of the display data.

12. The method according to claim 1, comprising displaying the display data comprising the useful information such that the useful information recognizable to the viewer has predefined temporal color or grayscale changes.

13. The method according to claim 1, comprising displaying the display data comprising the useful information such that the useful information recognizable to the viewer has a predefined temporal movement pattern.

14. The method according to claim 1, wherein the display data comprises several separate pieces of useful information, and displaying the display data such that the several pieces of useful information are recognizable separately at the same time to the viewer.

15. The method according to claim 1, including, via the data carrier display, transferring data comprising a one-time password as the useful information to the terminal device for displaying on the display element.

16. The method according to claim 1, including synchronizing the displaying of the display data and the emission of the light signals with each other.

17. The method according to claim 16, including using the data carrier to actively initiate the displaying of the display data on the display element and to synchronize the emission of the light signals with the displaying of the display data.

18. The method according to claim 16, including using the data carrier and the terminal device to negotiate session parameters which comprise synchronization data relating to a synchronization of the displaying of the display data and of the emission of the light signals, wherein the data carrier emits the light signals according to the negotiated synchronization data, and the terminal device displays the display data on the display element according to the negotiated synchronization data.

19. The method according to claim 16, including displaying on the display element synchronization data which relate to the displaying of the display data, and using the data carrier to read out the displayed synchronization data and to emit the light signals according to the synchronization data.

20. The method according to claim 19, including displaying the synchronization data on the display element only when they are made visible through illumination with light signals.

21. The method according to claim 16, including executing on the terminal device a synchronization application which enables the viewer to predefine synchronization data according to which the light signals are emitted by the data carrier.

22. The method according to claim 16, including using the data carrier to scan the display data displayed on the display element and to change a synchronization of the emission of the light signals with the displaying of the display data until useful information is recognizable.

23. The method according to claim 1, including interrupting temporarily the emission of the light signals, so that untrustworthy display data are recognized by information recognizable even without emission of the light signals being displayed on the display element.

24. The method according to claim 1, wherein the light signals illuminate the display element directly.

25. A portable data carrier useable as an interface for connection to a terminal device, the data carrier comprising:
   a light emitting unit adapted to emit light signals to a display element of a terminal device, the terminal device being connectable to the data carrier, wherein
   the lights signals include electromagnetic waves within the electromagnetic wave spectrum,
   the display element of the terminal device is configured to display display data to a viewer,
   the display data includes useful information, and
   the light signals cause the useful information, which is not recognizable in the display data for a viewer of the display element when the display data are displayed on the display element without the light signals emitted by the portable data carrier to the display element, to become recognizable in the displayed data for the viewer of the display element when the light signals are emitted by the portable data carrier to the display element.

26. The data carrier according to claim 25, comprising a data communication interface for transfer of display data to a terminal device connectable to the data carrier, and a communication unit which is adapted to transfer display data via the data communication interface to such terminal device, said data being intended for displaying via the display element of the terminal device and comprising a one-time password as the useful information.

27. The data carrier according to claim 26, comprising a synchronization unit which is adapted to activate the communication unit and the light signal unit in coordination with each other such that the emission of the light signals by the light signal unit and the transfer of the display data by the communication unit are synchronized so as to enable a viewer of the display element to recognize the useful information.

28. The data carrier according to claim 25, comprising a synchronization unit which is adapted to activate the light signal unit according to predefined synchronization data such that light signals are emitted to the terminal device which are synchronized with the displaying of the display data on the display element of the terminal device so as to enable a viewer of the display element to recognize the useful information.

29. The data carrier according to claim 28, comprising a data communication interface; a control unit which is adapted to negotiate with the terminal device via the data communication interface session parameters which comprise synchronization data relating to a synchronization of the displaying of the display data and the emission of the light signals; wherein the synchronization unit is adapted to activate the light signal unit according to the negotiated synchronization data.

30. The data carrier according to claim 28, comprising a read-out unit which is adapted to read out from the display element synchronization data relating to the displaying of the display data and the emission of the light signals displayed on the display element of the terminal device, wherein the synchronization unit is adapted to activate the light signal unit according to the read-out synchronization data.

31. The data carrier according to claim 30, wherein the read-out unit is a brightness sensor adapted to read out the synchronization data from the display element as brightness information.

32. The data carrier according to claim 30, wherein the light signal unit is adapted to illuminate the synchronization data displayed on the display element, and the read-out unit is configured to only read out the synchronization data when they are made visible through illumination with light signals.

33. The data carrier according to claim 30, comprising a data communication interface and a communication unit which is adapted to receive synchronization data from a terminal device via the data communication interface, wherein the synchronization unit is arranged to activate the light signal unit according to the read-out synchronization data.

34. The data carrier according to claim 28, comprising a read-out unit which is adapted to scan the display element and to relay scan data to the synchronization unit, and the synchronization unit is adapted to change the activation of the light signal unit on the basis of the scan data so that useful information is recognizable on the display element.

35. The data carrier according to claim 25, wherein the light signal unit is adapted to emit the light signals in coordination with the displaying of the display data comprising the useful information and with spurious information on the display element so that the spurious information is masked out from the display data displayed on the display element and the useful information is recognizable to a viewer of the display element.

36. The data carrier according to claim 35, wherein the light signal unit is adapted to feed into an optical interface of the terminal device light signals which are adapted to cause a representation of a display background of an LCD display element such that the spurious information is not recognizable to a viewer against the display background of the LCD display element.

37. The data carrier according to claim 36, wherein the light signal unit is adapted to feed into the optical interface light signals which are adapted to cause a representation of the display background of the LCD display element in the same color or in the same grayscale value as the spurious information to be masked out.

38. The data carrier according to claim 35, wherein the light signal unit is a colored illumination source which is adapted to illuminate a color display element with color light signals which are coordinated with a color in which the spurious information is displayed on the color display element, such that the spurious information is not recognizable to the viewer.

39. The data carrier according to claim 35, wherein the light signal unit is an infrared illumination source which is adapted to illuminate with infrared light signals a foil covering the display element said foil being optically opaque to the spurious information.

40. The data carrier according to claim 35, wherein the light signal unit comprises at least one light-emitting diode.

41. The data carrier according to claim 25, wherein the light signal unit is adapted to emit the light signals such that useful information modulated through the displaying of the display data is demodulated and becomes recognizable to the viewer.

42. The data carrier according to claim 41, wherein the light signal unit is adapted to emit light signals in the form of sequential light pulses such that useful information time-modulated through sequential displaying of the display data is timedemodulated.

43. The data carrier according to claim 42, wherein the light signal unit is adapted to emit sequential light pulses such that the demodulated useful information is recognizable on the display element statically or time-varyingly.

44. The data carrier according to claim 41, wherein the light signal unit is a color light signal unit which is adapted to emit light signals in the form of color light signals such that useful information color-modulated through colored displaying of the display data on a colored display element is color-demodulated and becomes recognizable to the viewer.

45. The data carrier according to claim 25, wherein the light signal unit is adapted to emit the light signals such that the useful information recognizable to the viewer on the display element has predefined temporal color or grayscale value changes.

46. The data carrier according to claim 25, wherein the light signal unit is adapted to emit the light signals such that the useful information recognizable to the viewer on the display element has a predefined temporal movement pattern.

47. The data carrier according to claim 25, wherein the light signal unit is adapted to emit the light signals such that several separate pieces of useful information are recognizable to the viewer at the same time separately on the display element.

48. The data carrier according to claim 25, comprising an interruption unit which is adapted to temporarily interrupt the emission of the light signals by the light signal unit.

49. The data carrier according to claim 25, wherein the data carrier is a (U)SIM mobile communication card insertable into a mobile telecommunication terminal, or a chip card or a USB memory element or a USB lamp with a security element.

50. A terminal device, comprising an interface for connection to a portable data carrier according to claim 25 and a display element for displaying display data comprising useful information, wherein
the terminal device is adapted to display the display data on the display element, and
the useful information becoming recognizable in the displayed data for a view of the display if light signals emitted by the data carrier to the display element.

51. The terminal device according to claim 50, wherein the terminal device is a mobile telecommunication terminal, a transaction terminal or a computer with a computer monitor.

52. The data carrier according to claim 25, wherein the light signals illuminate the display element directly.

* * * * *